United States Patent
Liu et al.

(10) Patent No.: US 10,838,392 B2
(45) Date of Patent: Nov. 17, 2020

(54) MODELING AND COMPENSATION METHOD FOR THE SPINDLE'S RADIAL THERMAL DRIFT ERROR IN A HORIZONTAL CNC LATHE

(71) Applicant: Dalian University of Technology, Dalian (CN)

(72) Inventors: Kuo Liu, Dalian (CN); Yongqing Wang, Dalian (CN); Haibo Liu, Dalian (CN); Te Li, Dalian (CN); Haining Liu, Dalian (CN); Dawei Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 114 days.

(21) Appl. No.: 16/325,984

(22) PCT Filed: Nov. 6, 2017

(86) PCT No.: PCT/CN2017/109492
§ 371 (c)(1),
(2) Date: Feb. 15, 2019

(87) PCT Pub. No.: WO2019/084948
PCT Pub. Date: May 9, 2019

(65) Prior Publication Data
US 2020/0064810 A1 Feb. 27, 2020

(51) Int. Cl.
*G05B 19/404* (2006.01)
*B23Q 11/14* (2006.01)
*B23Q 17/22* (2006.01)

(52) U.S. Cl.
CPC ............ *G05B 19/404* (2013.01); *B23Q 11/14* (2013.01); *B23Q 17/22* (2013.01); *G05B 2219/35408* (2013.01)

(58) Field of Classification Search
CPC ........ G05B 19/404; G05B 2219/35408; B23Q 11/14; B23Q 17/22
See application file for complete search history.

(56) References Cited

U.S. PATENT DOCUMENTS

| 6,269,284 B1 * | 7/2001 | Lau ...................... G05B 19/404 700/160 |
| 6,456,896 B1 * | 9/2002 | Ito ......................... G05B 19/404 700/174 |

(Continued)

FOREIGN PATENT DOCUMENTS

| CN | 104597842 A | 5/2015 |
| CN | 105607575 A | 5/2016 |
| CN | 107168242 A | 9/2017 |
| CN | 107942934 A | 4/2018 |

OTHER PUBLICATIONS

Ko et al., "Particular behavior of spindle thermal deformation by thermal bending," 2003, International Journal of Machine Tools & Manufacture, 43, pp. 17-23. (Year: 2003).*
Haitao et al., "Simulation of thermal behavior of a CNC machine tool spindle," 2007, International Journal of Machine Tools & Manufacture, 47, pp. 1003-1010. (Year: 2007).*

*Primary Examiner* — Thomas C Lee
*Assistant Examiner* — Gary Collins
(74) *Attorney, Agent, or Firm* — Muncy, Geissler, Olds & Lowe, P.C.

(57) ABSTRACT

The invention provides a method for modeling and compensating for the spindle's radial thermal drift error in a horizontal CNC lathe, which belongs to the field of error compensation technology of CNC machine tools. Firstly, the thermal drift error of two points in the radial direction of the spindle and the corresponding temperature of the key points are tested; then the thermal inclination angle of the spindle is obtained based on the thermal tilt deformation mechanism of the spindle, and the correlation between the thermal inclination angle and the temperature difference between the left and right sides of the spindle box is analyzed. According (Continued)

to the positive or negative thermal drift error of the two points that have been measured and the elongation or shortening of the spindle box on the left and right sides, the thermal deformation of the spindle is then classified and the thermal drift error model under various thermal deformation attitudes is then established. Then the influence of the size of the machine tool's structure on the prediction results of the model is analyzed. In real-time compensation, the thermal deformation attitude of the spindle is automatically judged according to the temperature of the key points, and the corresponding thermal drift error model is automatically selected to apply the compensation to the spindle. The method is used to distinguish the thermal deformation attitude of the spindle in a CNC lathe, and the thermal deformation mechanism is used to predict the radial thermal drift error of the spindle.

1 Claim, 7 Drawing Sheets

(56) References Cited

U.S. PATENT DOCUMENTS

| | | | | |
|---|---|---|---|---|
| 7,245,983 B2* | 7/2007 | Suzuki | ............... | G05B 19/404 |
| | | | | 700/174 |
| 10,088,826 B2* | 10/2018 | Jalluri | ............... | G05B 19/404 |
| 2010/0152881 A1 | 6/2010 | Ou et al. | | |
| 2015/0370242 A1* | 12/2015 | Takeno | ............... | G05B 19/404 |
| | | | | 700/193 |
| 2017/0023417 A1* | 1/2017 | Koyama | ............... | G01K 7/427 |
| 2018/0178339 A1* | 6/2018 | Hwang | ............... | G05B 19/402 |
| 2018/0196405 A1* | 7/2018 | Maekawa | ............ | G05B 19/404 |
| 2018/0364677 A1* | 12/2018 | Jalluri | ................ | G01K 1/026 |
| 2019/0033820 A1* | 1/2019 | Zhi | ..................... | G05B 19/404 |

\* cited by examiner

Fig. 1(Fig.1 as an illustration in Abstract)

Fig.7(a) The spindle's error values in the X direction

Fig.7(a)

Fig.7(b) The temperature values on the left and right sides of the spindle box

MODELING AND COMPENSATION METHOD FOR THE SPINDLE'S RADIAL THERMAL DRIFT ERROR IN A HORIZONTAL CNC LATHE

TECHNICAL FIELD

The invention belongs to the field of error compensation technology of CNC machine tools, and is specifically a modeling and compensation method for the spindle's radial thermal drift error in a horizontal CNC lathe.

BACKGROUND ART

The thermal error of machine tools is a difficult problem that has puzzled the machine tool industry for several decades. Due to the existence of the thermal error of machine tools, the problems are as follows: The machining accuracy of a single piece is not up to standard; The consistency of the parts processed in batches is poor and the rate of waste products is high; In order to reduce the thermal error, the machine tool needs a heat engine after starting, and the energy consumption is large; If the requirement of machining accuracy is high, a constant temperature workshop should be set up. These problems show that thermal error can cause a lot of adverse effects on machine tools.

At present, there are two main methods to reduce the thermal error of machine tools: the error prevention method and the error compensation method. The error prevention method is used to eliminate or reduce the heat source in machine tools by design and manufacturing, but the biggest disadvantage is its high cost. When the precision of a machine tool reaches a certain degree, the cost of improving the accuracy of the machine tool will then increase exponentially. Thermal error compensation technology, as a method to improve the accuracy and stability of CNC machine tools, has many advantages such as relatively low cost, a wide range of applications and so on.

The thermal error of a CNC machine tool mainly includes two parts: the thermal error of the feed axis and the thermal error of the spindle. The thermal error of the feed shaft can be greatly reduced through the closed loop feedback of the grating scale, but the thermal error of the main shaft lacks an effective means to restrain it. The spindle's thermal error includes the axial thermal elongation error and the radial thermal drift error. At present, scholars have carried out a lot of research into compensating for the axial thermal elongation error of the spindle, and they have tried many modeling methods, such as the multiple regression method, the neural network method, the thermal modal method, the time series method the support vector machine and so on. However, there have been few studies on modeling and compensating for the spindle's radial thermal drift error. The only similarity is where T. J. Ko analyzed the thermal bending deformation caused by the thermal gradient of a vertical machining center spindle system, in 《Particular behavior of spindle thermal deformation by thermal bending》, and they established the prediction model for the spindle's radial thermal error. However, there is no compensation for the spindle, let alone the determination criteria of the thermal deformation attitude of the spindle and the analysis of the influence of the size of the machine tool's structure on the prediction results of the model.

However, the spindle's radial thermal error in a CNC lathe is very important, because operators are more concerned about the X-axis accuracy of the lathe than its Z-axis accuracy. The invention is aimed at the difficult problem of the spindle's radial thermal error compensation in a CNC lathe, and proposes a method for modeling and compensating for the spindle's radial thermal drift error in a horizontal CNC lathe.

CONTENTS OF THE INVENTION

The object of the invention is to provide an effective method for modeling and compensating for the spindle's radial thermal drift error in a horizontal CNC lathe, and to solve the problem of compensating for the spindle's radial thermal error in a CNC lathe.

In order to solve the technical problem, the technical proposal of the invention is as follows: Firstly, the thermal drift error of two points in the radial direction of the spindle of a CNC lathe and the corresponding key temperature points are tested. Then, the thermal dip angle of the spindle is obtained based on the thermal tilt deformation mechanism of the spindle, and the correlation between the thermal inclination angle and the temperature difference between the left and right sides of the spindle box is analyzed using the correlation analysis method. According to the positive or negative thermal drift error of the two measured points and the elongation or shortening of the headstock on the left and right sides, the thermal deformation of the spindle is classified and the thermal drift error model for various thermal deformation attitudes is then established. Then, the asymptotic integral method is used to analyze the influence of the size of the machine tool's structure on the predicted results of the model. For real-time compensation, the thermal deformation attitude of the spindle is automatically judged according to the temperature of the key points, and the corresponding thermal drift error model is automatically selected to compensate for the movement of the spindle.

The technical proposal of the invention:

A method for modeling and compensating for the spindle's radial thermal drift error in a horizontal CNC lathe, which comprises the following steps:

Step one: measurement of the radial thermal drift error and the temperature of the key points of the spindle of a CNC lathe.

When testing the radial thermal drift error and temperature of the spindle 1 of a CNC lathe, two temperature sensors are used respectively to measure the temperatures $T_1$ and $T_2$ of both the left and right sides of the spindle box 2, two displacement sensors are used to measure the error in the X direction of the two location points of the detecting check bar 5 clamped by the spindle 1; during the test, the spindle 1 is first heated by rotating it at a certain speed for a few hours (e.g. 4 hours), and then the spindle 1 is stopped for a few hours (e.g., 3 hours) to cool down.

The thermal error $e$, of the spindle 1 in the vertical direction produces the thermal error component $e_{i,x}$ in the X direction, and the thermal errors $e_{1,x}$ and $e_{2,x}$ of the spindle 1 in the X direction are calculated according to the following formula:

$$e_{2,x} = \sin(\alpha_{xdir}) \times e_2 \tag{1}$$

$$e_{1,x} = \sin(\alpha_{xdir}) \times e_1 \tag{2}$$

In the above formula, $\alpha^{xDIR}$ is the tilt angle of the X axis of lathe, i=1 or 2, 1 indicates the right side and 2 indicates the left side.

Step two: correlation analysis between the thermal inclination and the temperature difference of the spindle.

The thermal dip angle of the spindle 1, after being heated, is calculated using the following formula:

$$\varphi_s = \arctan \frac{e_{1,x} - e_{2,x}}{\sin(\alpha_{xdir}) \times L_{snr}} \quad (3)$$

In the above formula, $\varphi_s$ is the thermal dip angle of the spindle 1, and $L_{snr}$ is the distance between the two error measuring points.

The relation diagram between the thermal dip $\varphi_s$ of the spindle 1 and the difference of the two temperatures $\Delta T$ is then determined, $\Delta T = T_1 - T_2$, the similarity of the two curves is then analyzed; further, the correlation between $\varphi_s$ and $\Delta T$ is calculated according to the following formula:

$$R(\varphi_s, \Delta T) = \frac{Cov(\varphi_s, \Delta T)}{\sqrt{Cov(\varphi_s, \varphi_s)Cov(\Delta T, \Delta T)}} \quad (4)$$

In the above formula, R is the correlation matrix between $\varphi_s$ and $\Delta T$, Coy ($\varphi_s$, $\Delta T$) is the covariance matrix between $\varphi_s$ and $\Delta T$;

Step three: the error models of the spindle's radial thermal drift under different thermal deformations.

According to the sign of the two error data points, $e_{1,x}$ and $e_{2,x}$, and the extension or shortening of the spindle box 2 on the left and right sides, the thermal deformation of the spindle 1 is divided into three categories and ten types; then $\delta_l$ is the thermal change on the left side of the spindle box 2 and $\delta_r$ is the thermal variation on the right side of the spindle box 2, both $\delta_l$ and $\delta_r$ are positive for thermal expansion and negative for thermal contraction; $d_{crs}$ is the distance from the intersection point of the spindle 1 in the initial state and the deformed spindle 1 to the right side of the spindle box 2, $d_{spl}$ is the distance between the left and right ends of the spindle box 2, $d_{ss}$ is the horizontal distance between the right end of the spindle box 2 and the left displacement sensor 7, $d_{snr}$ is the horizontal distance between the left displacement sensor 7 and the right displacement sensor 8; When the spindle 1 has the thermal deformation attitude that $\delta_l > \delta_r \geq 0$, and the check bar 5 is close to the left displacement sensor 7 and the right displacement sensor 8, the relationship between the radial thermal drift error of the spindle 1 and the temperature is then established; the linear relationship between the thermal expansion of the left and right sides of the spindle box 2 and the temperature is expressed by the formulas (5) and (6):

$$\delta_l(t) = \zeta_{l1} \times (T_1(t) - T_1(0)) + \zeta_{l2} \quad (5)$$

$$\delta_r(t) = \zeta_{r1} \times (T_2(t) - T_2(0)) + \zeta_{r2} \quad (6)$$

In the above formulas, $\zeta_{l1}$, $\zeta_{l2}$, $\zeta_{r1}$ and $\zeta_{r2}$ are the coefficients to be identified;

When the spindle 1 has the thermal deformation attitude that $\delta_l > \delta_r \geq 0$, and the check bar 5 is close to the left displacement sensor 7 and the right displacement sensor 8, the $d_{crs}(t)$ for any time t can be calculated from formula (7):

$$d_{crs}(t) = \frac{\delta_r(t)}{\delta_l(t) - \delta_r(t)} \times d_{spl} \quad (7)$$

The thermal drift errors, $e_{1,x}(t)$ and $e_{2,x}(t)$, of the spindle 1 in the X direction at any time t can be calculated by formulas (8) and (9):

$$e_{2,x}(t) = \frac{\delta_l(t)d_{ss} - \delta_r(t)d_{ss} - \delta_r(t)d_{spl}}{\sin(\alpha_{xdir})^{-1}d_{spl}} \quad (8)$$

$$e_{1,x}(t) = \frac{(\delta_l(t) - \delta_r(t))(d_{ss} + d_{snr}) - \delta_r(t)d_{spl}}{\sin(\alpha_{xdir})^{-1}d_{spl}} \quad (9)$$

Step four: analysis of the influence of the size of the machine tool's structure on the predicted result of the model The influence of the measurement bias of $d_{spl}$ and $d_{ss}$ in the thermal drift error model on the predicted results of the model is analyzed, and the reliability of the fluctuation value of the predicted residuals within a certain allowable deviation range is analyzed using the asymptotic integration method; the expression of the function Z for the problem is described as:

$$Z = gx(X) = \delta - \delta_a(d_{spl}, d_{ss}) \quad (10)$$

In the above formula, X is a random vector composed of $d_{spl}$ and $d_{ss}$, $\delta$ is the allowable deviation index, $\delta_a$ is the fluctuation value of the predicted residuals and is defined as:

$$\delta_a(d_{spl}, d_{ss}) = \frac{\sum_{i=1}^{N} |R(i) - R_n(i)|}{N} \quad (11)$$

In the above formulas, R is the predicted residual of $d_{spl}$ and $d_{ss}$ as random variables, which is a function of $d_{spl}$ and $d_{ss}$, $R_n$ is the predicted residual of the model when $d_{spl}$ and $d_{ss}$ are true values, and N is the number of sampling points when the thermal error is measured;

If $f_x(x)$ is a joint probability density function of X, then the probability that the fluctuation value of the predicted residuals do not fall within a certain allowable deviation range is calculated from formula (12):

$$p_f = \int_{gx(x) \leq 0} \exp[h(x)]dx \quad (12)$$

In the above formulas, $h(x) = \ln f_x(x)$;

If $x = (d_{spl}^*, d_{ss}^*)^T$ is a point on the surface of the limit state, at this point, then h (x) is expanded into a Taylor series and taken to the quadratic term:

$$h(x) = h(x^*) + \frac{1}{2}v^T Bv - \frac{1}{2}(x - x^* - Bv)B^{-1}(x - x^* - Bv) \quad (13)$$

In the above formulas:

$$v = \nabla h(x^*) \quad (14)$$

$$B = [\nabla^2 h(x^*)]^{-1} \quad (15)$$

The limit state surface $Z = gx(X) = 0$ is replaced by a hyperplane at point x* to realize the asymptotic integration of the probability that the fluctuation value of the predicted residual error exceeds the allowable range; The First-order Second-moment Method is used to calculate the reliability index that the fluctuation value of the predicted residuals belongs in a certain allowable deviation range according to formula (16):

$$\beta_L = \frac{\mu_{Z_L}}{\sigma_{Z_L}} = \frac{[\nabla gx(x^*)]^T Bv}{\sqrt{[\nabla gx(x^*)]^T B \nabla gx(x^*)}} \quad (16)$$

The First-order Second-moment Method is used to calculate the failure probability index that the fluctuation value of the predicted residual belongs in a certain allowable deviation range according to formula (17):

$$p_{fL} = (2\pi)^{n/2} \sqrt{\det B} \, f_x(x^*) \exp\left(\frac{v^T B v}{2}\right) \Phi(-\beta_L) \qquad (17)$$

According to the Lagrange multiplier method for solving optimization problems, the multiplier λ is introduced. From $$\frac{\partial L(x^*, \lambda)}{\partial x} = 0,$$

which is one of the stationary value conditions of the functional L (x,λ)=h(x)+λgx(x), the following result is then obtained:

$$\nabla gx(x^*) = -\frac{1}{\lambda} \nabla h(x^*) = -\frac{v}{\lambda} \qquad (18)$$

By substituting formula (18) into formula (16), the following result is obtained:

$$\beta_L = \sqrt{v^T B v} \qquad (19)$$

By substituting formula (19) into formula (17), the following result is obtained:

$$p_{fL} \approx (2\pi)^{(n-1)/2} f_x(x^*) \sqrt{\frac{\det B}{v^T B v}} \qquad (20)$$

The reliability that the fluctuating value of the predicted residuals, calculated by the asymptotic integration method, falls within a certain allowable deviation range is then obtained according to (21):

$$p_r = 1 - p_{fL} \qquad (21)$$

Step five: determination of the spindle's thermal deformation attitude and model selection.

The thermal deformation $\delta_l$, $\delta_r$ and $d_o$ of the two sides of the spindle box 2 is used to judge the thermal deformation attitude of the spindle 1 which changes irregularly in the processing process. Where $d_o$ is the distance from the intersection point of the spindle 1 in the initial state and the deformed spindle 1 to the right side of the spindle box 2; under the various thermal deformation attitudes, the formulas of $d_o$ are calculated from formula (22):

$$d_\sigma(t) = d_{spl} \times \left| \frac{\zeta_{r1}(T_2(t) - T_2(0)) + \zeta_{r2}}{\zeta_{l1}(T_1(t) - T_1(0)) - \zeta_{r1}(T_2(t) - T_2(0)) + \zeta_{l2} - \zeta_{r2}} \right| \qquad (22)$$

The ten criteria for determining the thermal deformation attitudes of the spindle are set as follows:

Attitude (1): $\delta_l > \delta_r \geq 0$, $d_o \leq d_{ss}$
Attitude (2): $\delta_r < 0 < \delta_l$
Attitude (3): $\delta_r \leq \delta_l < 0$
Attitude (4): $\delta_l > \delta_r < 0$, $d_{ss} + d_{snr} < d_o$
Attitude (5): $\delta_l > \delta_r \geq 0$, $d_{ss} < d_o < d_{ss} \pm d_{snr}$
Attitude (6): $\delta_l < \delta_r < 0$, $d_{ss} < d_o \leq d_{ss} + d_{snr}$
Attitude (7): $\delta_l > \delta_r \geq 0$, $d_{ss} + d_{snr} < d_o$
Attitude (8): $\delta_r > \delta_l \geq 0$
Attitude (9): $\delta_l < 0 < \delta_r$
Attitude (10): $\delta_l < \delta_r < 0$, $d_o \leq d_{ss}$ Finally, considering the thermal tilt of the spindle 1, the different errors are compensated for different lengths of the workpieces; if $d_{wp}$ is the distance between the processed point on the workpiece and the end face of the chuck 9, and $d_s$ is the distance between the left displacement sensor 7 and the end face of the chuck 9; under the various thermal deformation attitudes, whether $d_{wp} < d_s$, $d_s < d_{wp} < d_s + d_{snr}$ or $d_{wp} > d_s + d_{snr}$, the amount of thermal error compensation $e_{wp}$ of the machined spot on the workpiece is then calculated in accordance with formula (23):

$$e_{wp} = \frac{e_{2,x}(d_s + d_{snr} - d_{wp}) - e_{1,x}(d_s - d_{wp})}{d_{snr}} \qquad (23)$$

The thermal error's predicted value $e_{wp}$ is then inputted into the CNC system of the machine tool in real time to realize thermal error compensation for the spindle of the CNC lathe at any position or time.

The beneficial effects of the invention are as follows:

(1) it provides a new method for the spindle's radial thermal error compensation in a horizontal CNC lathe, and solves the problem of the radial thermal error compensation for a horizontal CNC lathe;

(2) it improves the accuracy and stability of the CNC lathe's spindle;

(3) it solves the problem of poor consistency in the processing of batches of discs and shaft parts, and reduces the rejection rate;

(4) it only needs to collect the error and temperature data at one time for a certain spindle speed, and the test process is simple and fast;

(5) the thermal error prediction model is based on the thermal tilt deformation mechanism of the spindle, and the model is robust;

(6) the thermal error prediction model takes into account ten thermal deformation postures obtained from the theoretical analysis, so the model is suitable for the case of arbitrary spindle speed changes and ambient temperature changes.

(7) the model can automatically judge the thermal deformation attitude of the spindle according to the temperature on the left and right sides of the spindle box, and then adopt the corresponding thermal error model.

DESCRIPTION OF FIGURES

FIGS. 5(a)—5(d) show the diagram of the spindle's thermal deformation attitude in the CNC lathe;

FIGS. 7(a)—7(b) show the error and temperature diagram of the spindle at different rotational speeds;

FIGS. 10(a)—10(c) show the simulation result of the spindle at each of the speeds listed below;

In the figure: 1 spindle; 2 spindle box; 3 left side temperature sensor; 4 right side temperature sensor; 5 check bar; 6 displacement sensor bracket; 7 left side displacement sensor; 8 right side displacement sensor; 9 chuck.

MODE OF CARRYING OUT THE INVENTION

In order to make the purpose, technical proposal and the advantages of the invention clearer, the present invention is described in detail in combination with a specific embodiment of the measurement, and the modeling and compensation for the spindle's radial thermal drift error, with reference to the drawings.

The description provides a detailed embodiment and a specific operation process based on the technical proposal of the invention, but the scope of the protection of the invention is not limited to the following embodiments.

The X-axis saddle of the horizontal CNC lathe has a tilt angle of 60°. The mechanical spindle 1 is installed horizontally on the bed and is driven by a belt; the highest rotational speed of which is 5000 rpm. The distance between the two sides of the spindle box 2 is 356 mm. The distance between the right side of the spindle box 2 and the left side displacement sensor 7 during the test is 251 mm. The distance between the left displacement sensor 7 and the right displacement sensor 8 is 76.2 mm.

Figure 1:
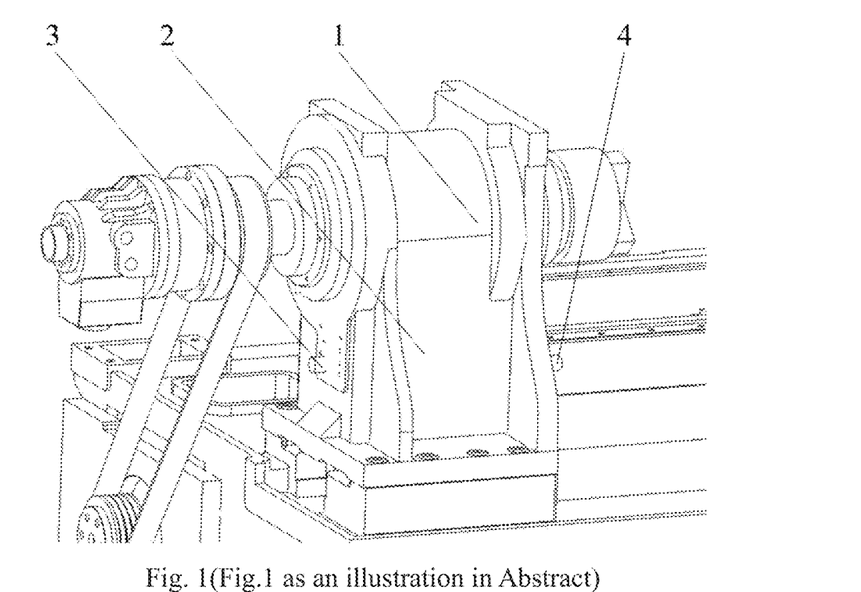
FIG. 1 shows the configuration of the spindle system and the layout of the temperature sensor.
Figure 2:
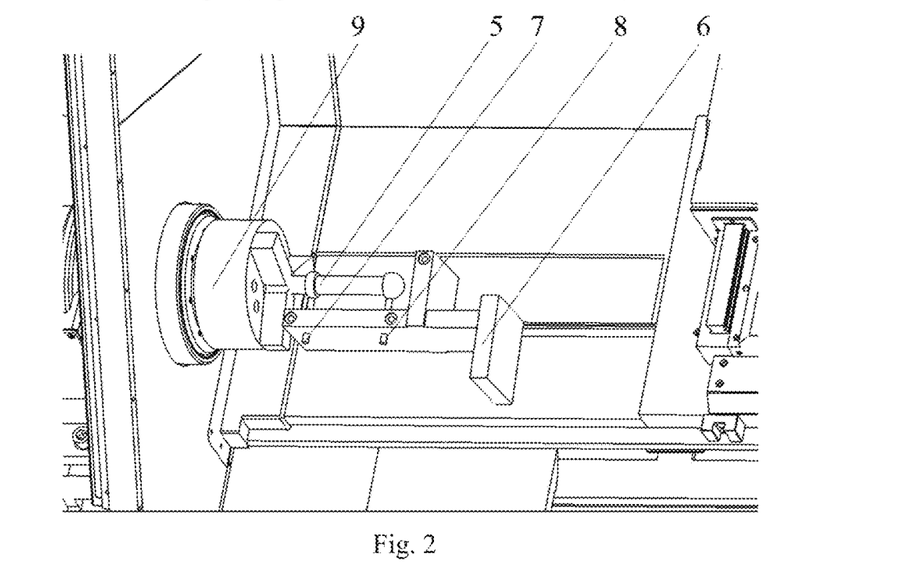
FIG. 2 shows the error test instrument and its installation diagram.
Figure 3:
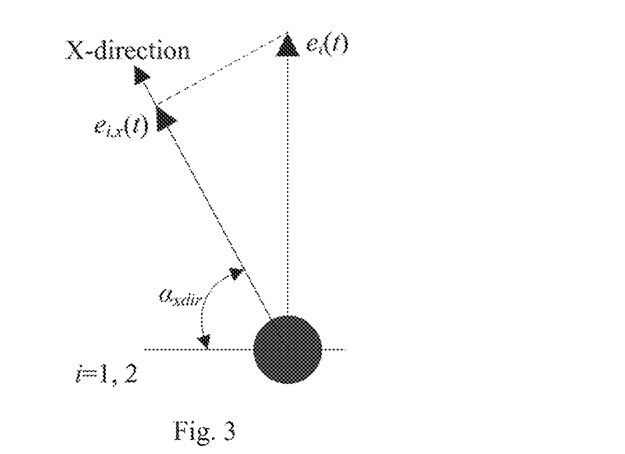
FIG. 3 shows the decomposition diagram of the radial thermal drift error of the spindle.
Figure 4:
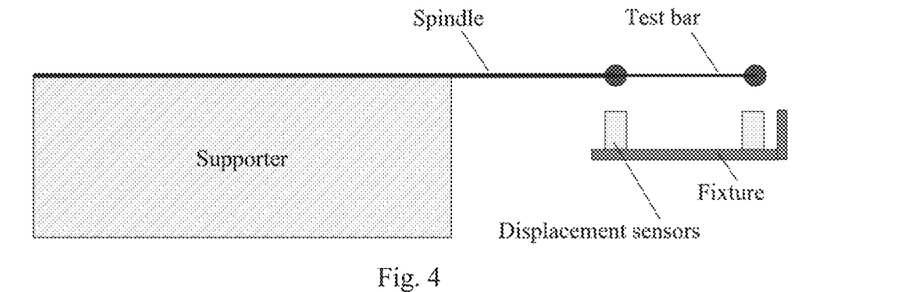
FIG. 4 shows the schematic diagram of the spindle in its initial thermal equilibrium state.

The specific steps taken are as follows:

Step one: measurement of the radial thermal drift error and the temperature of the key points of the spindle in the CNC lathe When testing the radial thermal drift error and temperature of the spindle 1 in the CNC lathe, two temperature sensors are used respectively to measure the temperatures $T_1$ and $T_2$ of both the left and right sides of the spindle box 2 (FIG. 1). Two displacement sensors are used to measure the error in the X direction of the two position points of the detecting check bar 5 clamped by the spindle 1 (FIG. 2). During the test, the spindle 1 is first rotated for 4 hours at 4000 rpm, and then the spindle 1 is stopped and left for 3 hours, and the error and the temperature data are then collected. In the same way, the error and temperature data of the spindle at 3000 rpm and 2000 rpm are collected.

Figure 7A:
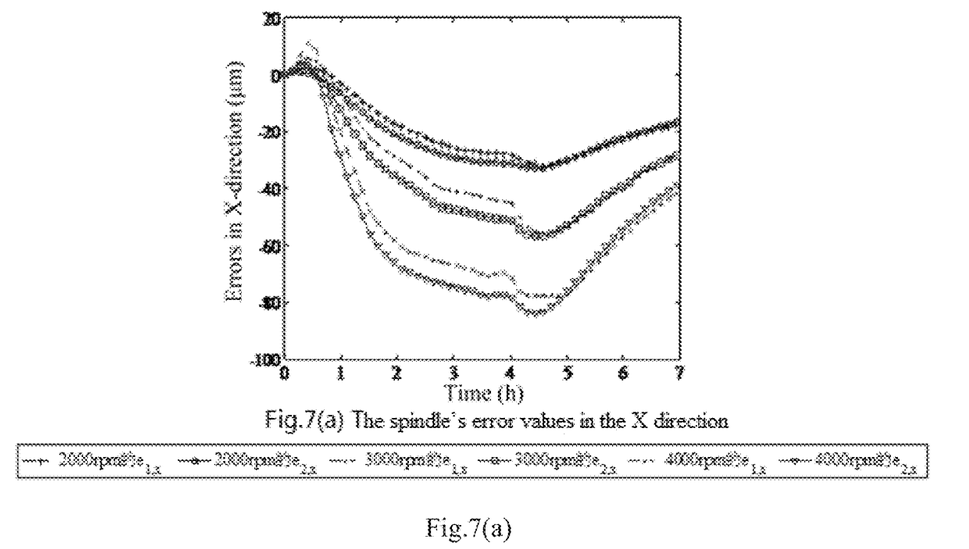
FIG. 7(a) shows the spindle's error values in the X direction.
Figure 7B:
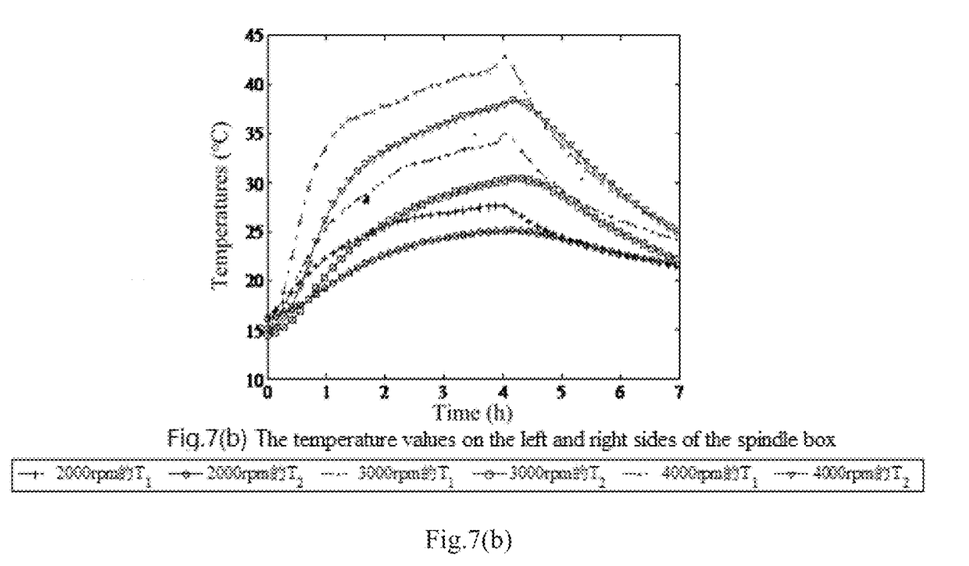
FIG. 7(b) shows the temperature values on the left and right sides of the spindle box.

Thus, the X direction's thermal drift errors $e_1$, and $e_2$, of the two measured points in the process of heating and cooling of the spindle 1 at different rotational speeds, as well as the temperatures of the left and right sides of the spindle box 2 ($T_1$ and $T_2$), are obtained. As shown in FIG. 7.

Step two: correlation analysis between the thermal inclination and the temperature difference of the spindle.

Figure 8:
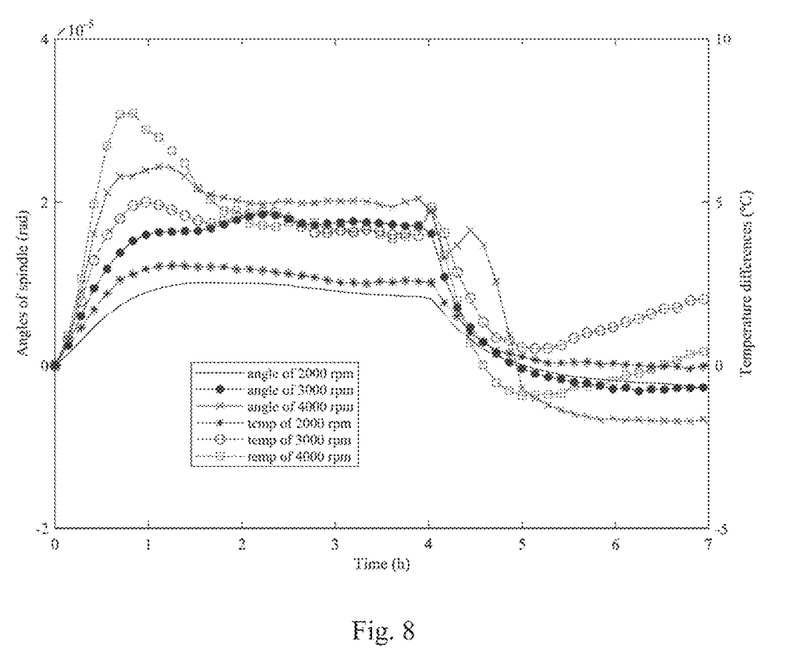
FIG. 8 shows the diagram of the relationship between the thermal dip angle and the temperature difference of the spindle.

The thermal dip angle of the spindle 1 is calculated according to formula (3), and the relationship diagram between the thermal inclination $\varphi_s$ and the temperature difference ($\Delta T=T_1-T_2$) of the spindle 1 at different rotational speeds is then plotted (FIG. 8). It can be seen that at different speeds, there is a strong correlation between $\varphi_s$ and $\Delta T$.

Furthermore, the correlation between $\varphi_s$ and $\Delta T$ is calculated according to formula (4). At speeds of 4000, 3000 and 2000 rpm, the correlation coefficients between the thermal dip $\varphi_s$ and the temperature difference $\Delta T$ are 0.898, 0.940 and 0.992, respectively. Through these results, it can be further seen that there is a strong correlation between the thermal dip $\varphi_s$ and the temperature difference $\Delta T$ at different rotational speeds, which fully shows that the thermal tilt of the spindle is mainly caused by the temperature difference between the two sides of the spindle box.

Step three: the error models of the spindle's radial thermal drift under different thermal deformations.

All possible thermal deformation attitudes of the spindle 1 are analyzed. Then according to the signs of the two error data readings, $e_{1,x}$ and $e_{2,x}$, and the extension or contraction of the spindle box 2 on the left and right sides, the thermal deformation of the spindle 1 is divided into three categories and ten types, as shown in FIG. 5. Taking the thermal deformation attitude (1) in FIG. 5 as an example, the relationship between the radial thermal drift error of the spindle 1 and the temperature is then established. Although the temperatures on the left and right sides of the spindle box are not identical, the temperature field of the spindle box is continuous and approximately linear. Therefore, a linear relationship between the thermal expansion of the two sides of the spindle box and the temperature is then established, and the dynamic change of the thermal expansion of the two sides of the spindle box is characterized by the temperature. The relation model is expressed as formulas (5) and (6).

For the thermal deformation attitude shown in FIG. 5 (1), $d_{crs}(t)$ for any time t can be calculated by formula (7).

Figure 5A:
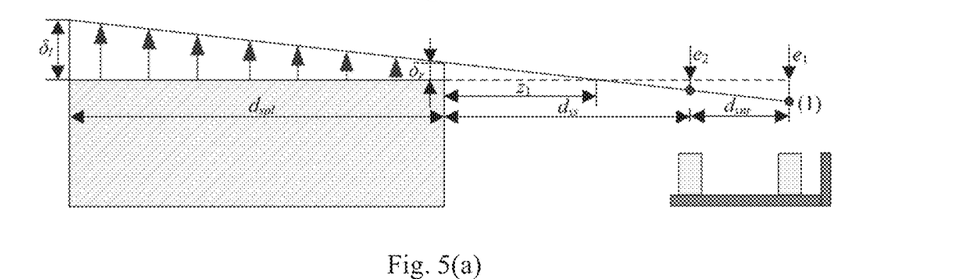
FIG. 5(a) shows the thermal deformation attitude (1) under the condition of $e_1 > 0$, and $e_2 > 0$.
Figure 5B:
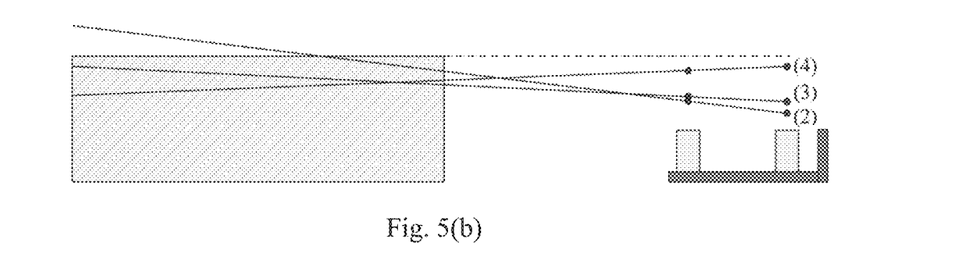
FIG. 5(b) shows the thermal deformation attitude (2)-(4) under the condition of $e_1>0$, and $e_2>0$.
Figure 5C:
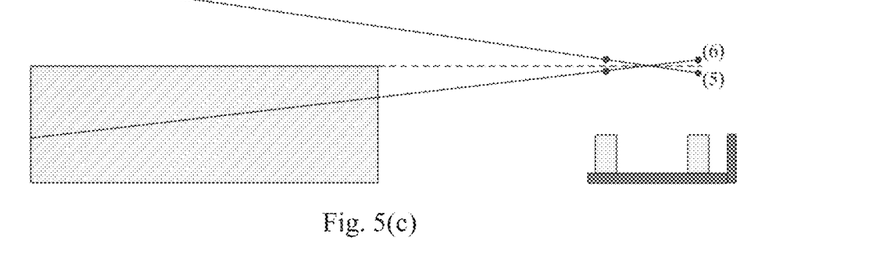
FIG. 5(c) shows the thermal deformation attitude (5) under the condition of $e_1>0$, and $e_2<0$; as well as the thermal deformation attitude (6) under the condition of $e_1<0$, and $e_2>0$.
Figure 5D:
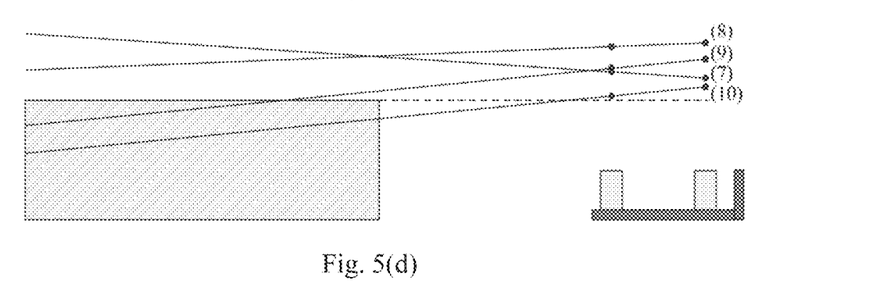
FIG. 5(d) shows the thermal deformation attitude (7)-(10) under the condition of $e_1<0$, and $e_2<0$.
Figure 6:
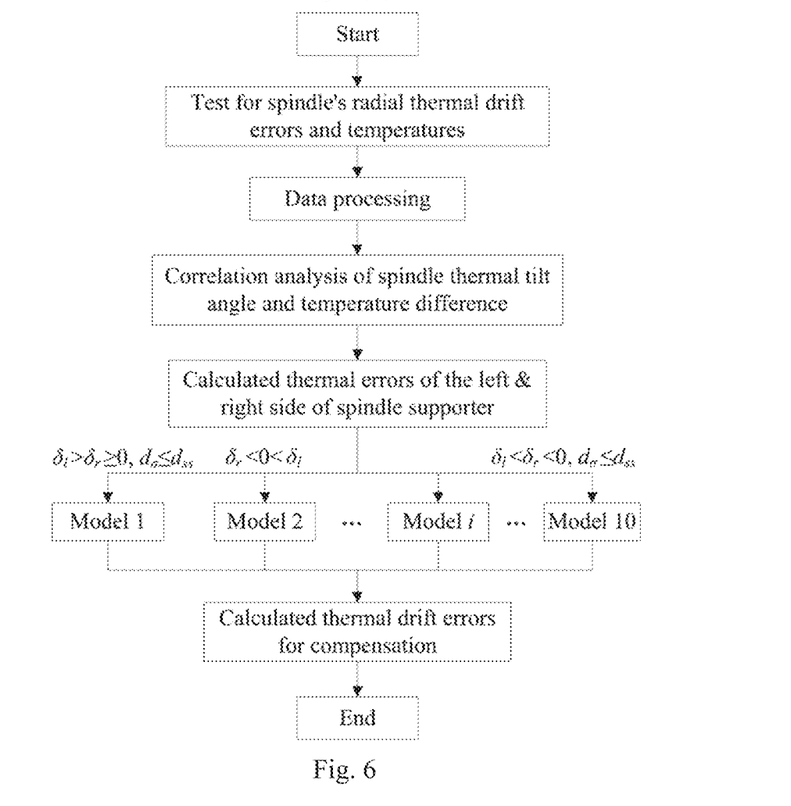
FIG. 6 shows the flow chart of the modeling and compensation for the radial thermal drift error of the spindle.

The thermal drift errors, $e_{1,x}(t)$ and $e_{2,x}(t)$, of the spindle 1 in the X direction at any time t can be calculated by formulas (8) and (9).

The model of the relation between the thermal error and the temperature of the thermal deformation attitude shown in FIG. 5 is then obtained with reference to FIG. 5 (1).

The thermal variations $\delta_l$ and $\delta_r$ of the two sides of the spindle box 2 are obtained using the test error values, $e_{1,x}$ and $e_{2,x}$, at 4000 rpm, respectively. Thus, from formulas (5) and (6), the independent variables, $T_1$ and $T_2$, and the dependent variables, $\delta_l$ and $\delta_r$, are known, and the least squares method is then used to identify their parameters. The identified parameters are shown in Table 1.

TABLE 1

Identified parameters

| Parameters | Parameter value |
|---|---|
| $\zeta_{l1}$ | 5.26 |
| $\zeta_{l2}$ | 2 |
| $\zeta_{r1}$ | 4.37 |
| $\zeta_{r2}$ | 2 |

Step four: analysis of the influence of the size of the machine tool's structure on the prediction result of the model.

For this horizontal CNC lathe, $d_{spl}$=356 mm, $d_{ss}$=251 mm, $d_{snr}$=76.2 mm. The measured values of $d_{spl}$ and $d_{ss}$ are set to fluctuate within a certain range and they meet the mean values $\mu_{d_{spl}}$=350 and $\mu_{d_{ss}}$=257, with a variance of $\sigma_{d_{spl}}^2$=24 and $\sigma_{d_{ss}}^2$=19, respectively. As the distribution types of the measured values of $d_{spl}$ and $d_{ss}$ are unknown, the asymptotic integral method is then used to analyze the reliability of the fluctuation value of the predicted residual error being less than 1 μm. For this problem, the expression of its function Z is defined as in formula (10).

According to formulas (12)-(20), the reliability of the fluctuation value of the predicted residual error being less than 1 μm is calculated to be $$p_r = 1 - (2\pi)^{(n-1)/2} f_x(x^*) \sqrt{\frac{\det B}{v^T B v}} \approx 1 \qquad (30)$$

using the asymptotic integration method.

As can be seen, $p_r$ is approximately equal to 1, indicating that the fluctuations in $d_{spl}$ and $d_{ss}$ have little effect on the predicted results. Therefore, although the values of $d_{spl}$ and $d_{ss}$ measured in the test site have errors, they do not affect the prediction accuracy of the model.

Step five: determination of the spindle's thermal deformation attitude and model selection.

The thermal deformations $\delta_l$, $\delta_r$ and $d_\sigma$ of the two sides of the spindle box 2 are used to judge the thermal deformation attitude of the spindle 1 which changes irregularly in the processing process. Where $d_\sigma$ is the distance from the intersection point of the spindle 1 in the initial state and the deformed spindle 1 to the right side of the spindle box 2; under various thermal deformation attitudes, the value of $d_\sigma$ is calculated from formula (22).

Figure 9:
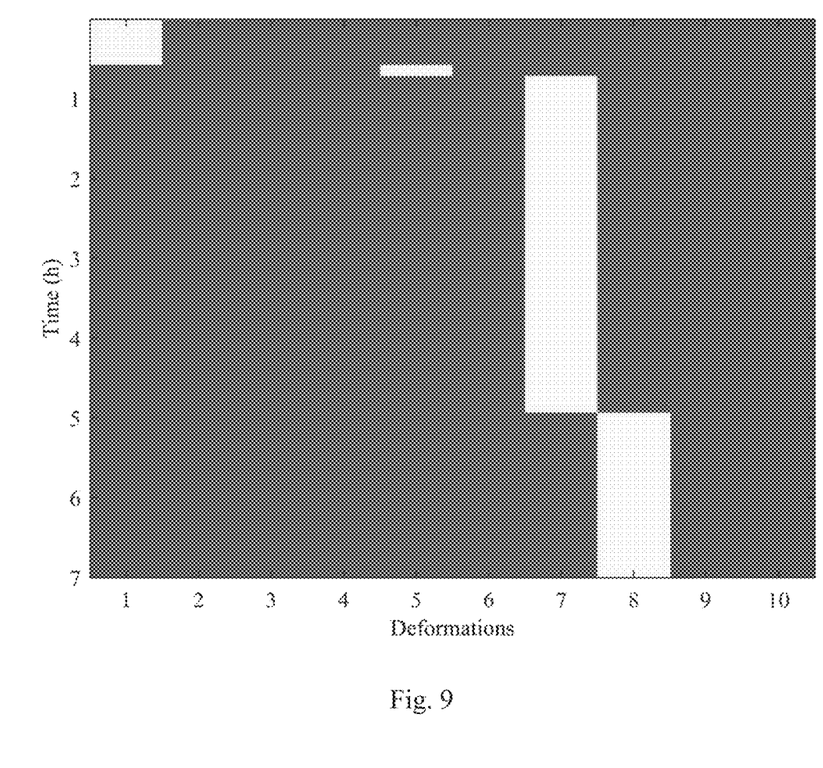
FIG. 9 shows the transition diagram of the thermal deformation state at 4000 rpm.

According to the criteria for determining the ten thermal deformation attitude of the spindle 1, FIG. 9 shows the thermal attitude switching diagram obtained by the spindle 1 at 4000 rpm according to the above criteria. It can be seen that, in the time range of 0 to 0.57 h, the spindle has the attitude (1); in the time range of 0.58 and 0.71 h, the spindle has the attitude (5); in the time range of 0.72 h to 4.93 h, the spindle has the attitude (7); in the time range of 4.94 h and 7 h, the spindle has the attitude (8).

Since the spindle 1 generates a thermal tilt error, the amount of compensation required for workpieces of different lengths is different. Setting that $d_{wp}$ is the distance between the processed point on the workpiece and the end face of the chuck 9, and $d_s$ is the distance between the left displacement sensor 7 and the end face of the chuck 9; for the ten thermal deformation attitudes shown in FIG. 5, when $d_{wp} < d_s$, $d_s < d_{wp} < d_s + d_{snr}$ and $d_{wp} > d_s + d_{snr}$, the amount of thermal error compensation $e_{wp}$ of the machined spot on the workpiece is then calculated in accordance with formula (23).

Figure 10A:
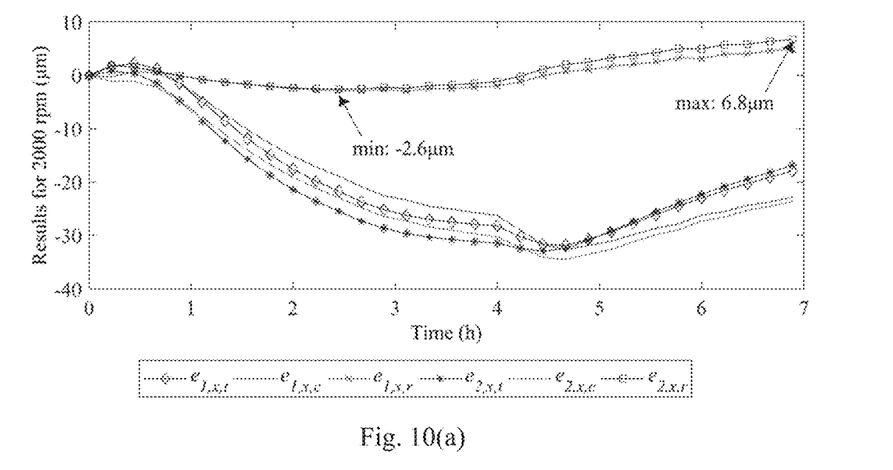
FIG. 10(a) shows the result under the condition of 2000 rpm.
Figure 10B:
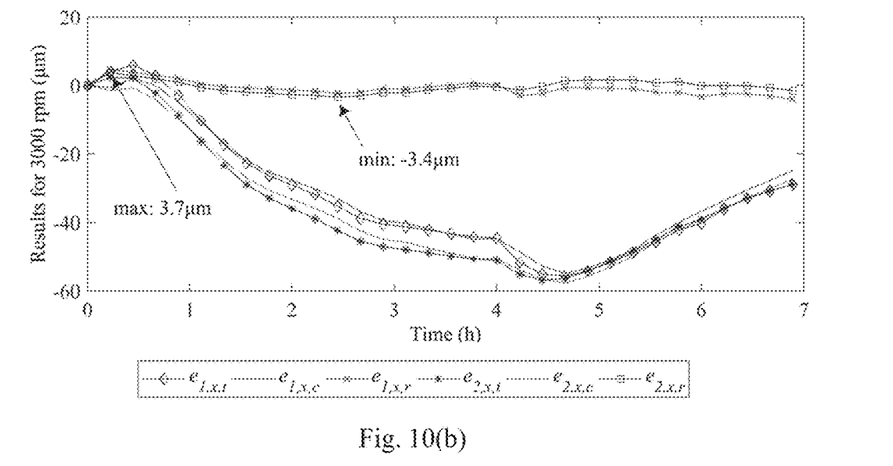
FIG. 10(b) shows the result under the condition of 3000 rpm.
Figure 10C:
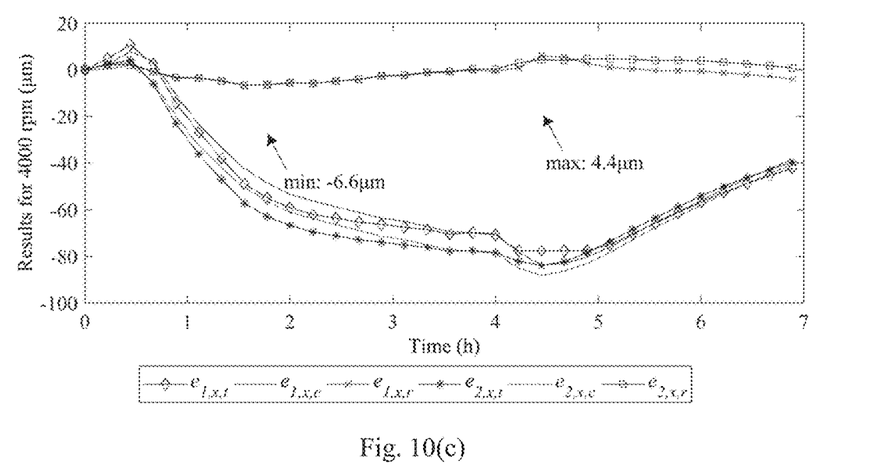
FIG. 10(c) shows the result under the condition of 4000 rpm.

FIG. 10 shows the simulation results for the spindle 1 at different speeds. Where $e_{1,x,t}$ represents the test value of $e_{1,x}$, $e_{1,x,c}$ represents the calculated value of $e_{1,x}$, $e_{1,x,r}$ represents the simulated residual value of $e_{1,x}$, $e_{2,x,t}$ represents the test value of $e_{2,x}$, $e_{2,x,c}$ represents the calculated value of $e_{2,x}$, and $e_{2,x,r}$ represents the simulated residual value of $e_{2,x}$.

Figure 11:
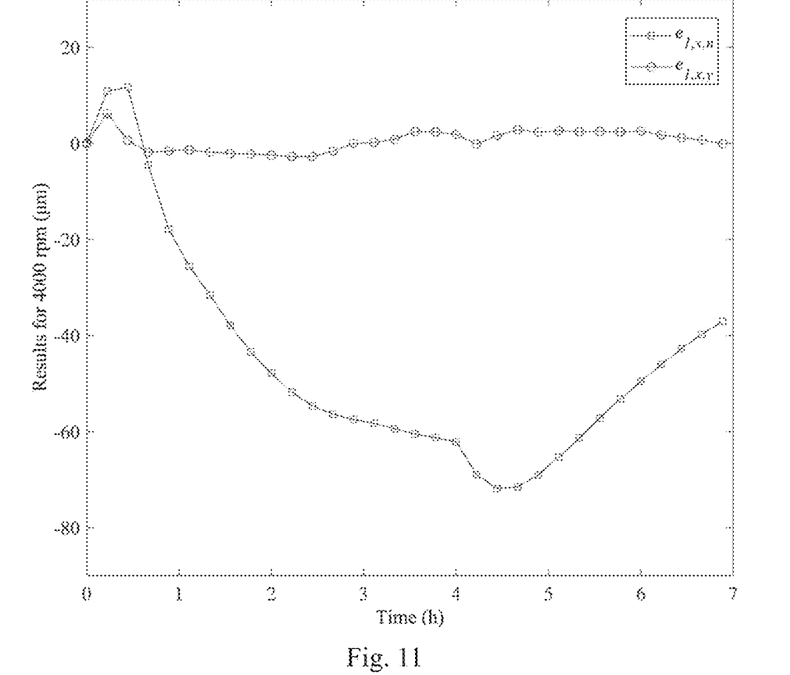
FIG. 11 shows the data diagram before and after compensation for the spindle at 4000 rpm.
Figure 12:
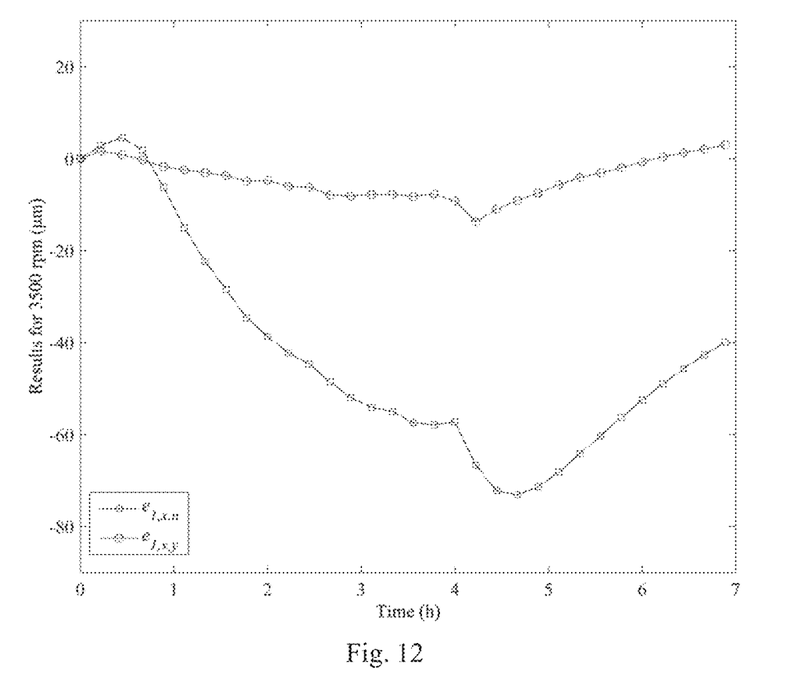
FIG. 12 shows the data diagram before and after compensation for the spindle at 3500 rpm.

Under the condition of compensation and non-compensation, the experiment is carried out again at 4000 rpm and 3500 rpm on the horizontal CNC lathe, and the two temperature sensors and two displacement sensors are used to collect the temperature and the thermal error of spindle 1 at the same time. The comparison of before and after compensation is shown in FIG. 11 and FIG. 12.

It should be noted that the above specific embodiments of the invention are only used to illustrate the principles and processes of the invention and do not constitute a limitation to the invention. Accordingly any modification and equivalent substitution made without departing from the spirit and scope of the present invention shall be covered by the protection of the present invention.

We claim:

1. The invention relates to a method for modeling and compensating for the spindle's radial thermal drift error in a horizontal CNC lathe, comprising:
   measuring the radial thermal drift error and the temperature of the key points of the spindle of a CNC; lathe, said measuring the radial thermal drift error comprising:
   testing the radial thermal drift error and temperature of the spindle of a CNC lathe; using two temperature sensors respectively to measure the temperatures $T_1$ and $T_2$ of both the left and right sides of the spindle box, using two displacement sensors to measure the error in the X direction of the two location points of the detecting check bar clamped by the spindle; during the test, heating the spindle by rotating the spindle at a certain speed for a few hours, and then stopping the spindle for a few hours to cool down, wherein the thermal error $e_i$ of the spindle in the vertical direction produces the thermal error component $e_{i,x}$ in the X direction, and the thermal errors $e_{1,x}$ and $e_{2,x}$ of the spindle in the X direction are calculated according to the following formula:

$$e_{2,x} = \sin(\alpha_{xdir}) \times e_2 \qquad (1)$$

$$e_{1,x} = \sin(\alpha_{xdir}) \times e_1 \qquad (2)$$

wherein in the above formula, $\alpha_{xdir}$ is the tilt angle of the X axis of lathe, i=1 or 2, 1 indicates the right side and 2 indicates the left side;
   analyzing between the thermal inclination and the temperature difference of the spindle, said analyzing comprising:
   calculating the thermal dip angle of the spindle, after being heated, using the following formula:

$$\varphi_s = \arctan \frac{e_{1,x} - e_{2,x}}{\sin(\alpha_{xdir}) \times L_{snr}} \qquad (3)$$

wherein in the above formula, $\varphi_s$ is the thermal dip angle of the spindle and $L_{snr}$ is the distance between the two error measuring points;

determining the relation diagram between the thermal dip $\varphi_s$ of the spindle and the difference of the two temperatures $\Delta T$ is then determined, $\Delta T = T_1 - T_2$, analyzing the similarity of the two curves; and calculating the correlation between $\varphi_s$ and $\Delta T$ according to the following formula:

$$R(\varphi_s, \Delta T) = \frac{\mathrm{Cov}(\varphi_s, \Delta T)}{\sqrt{\mathrm{Cov}(\varphi_s, \varphi_s)\mathrm{Cov}(\Delta T, \Delta T)}} \tag{4}$$

wherein in the above formula, R is the correlation matrix between $\varphi_s$ and $\Delta T$, Cov $(\varphi_s, \Delta T)$ is the covariance matrix between $\varphi_s$ and $\Delta T$;

setting up the error models of the spindle's radial thermal drift under different thermal deformations, and setting up comprising:

according to the sign of the two error data points, $e_{1,x}$ and $e_{2,x}$, and the extension or shortening of the spindle box on the left and right sides, dividing the thermal deformation of the spindle into three categories and ten types; then $\delta_l$ is the thermal change on the left side of the spindle box and $\delta_r$ is the thermal variation on the right side of the spindle box, both $\delta_l$ and $\delta_r$ are positive for thermal expansion and negative for thermal contraction; $d_{crs}$ is the distance from the intersection point of the spindle in the initial state and the deformed spindle to the right side of the spindle box, $d_{spl}$ is the distance between the left and right ends of the spindle box, $d_{ss}$ is the horizontal distance between the right end of the spindle box and the left displacement sensor, $d_{snr}$ is the horizontal distance between the left displacement sensor and the right displacement sensor; when the spindle has the thermal deformation attitude that $\delta_l > \delta_r \geq 0$, and the check bar is close to the left displacement sensor and the right displacement sensor, the relationship between the radial thermal drift error of the spindle and the temperature is then established; the linear relationship between the thermal expansion of the left and right sides of the spindle box and the temperature is expressed by the formulas (5) and (6):

$$\delta_l(t) = \zeta_{l1} \times (T_1(t) - T_1(0)) + \zeta_{l2} \tag{5}$$

$$\delta_r(t) = \zeta_{r1} \times (T_2(t) - T_2(0)) + \zeta_{r2} \tag{6}$$

wherein in the above formulas, $\zeta_{l1}$, $\zeta_{l2}$, $\zeta_{r1}$ and $\zeta_{r2}$ are the coefficients to be identified;

wherein when the spindle has the thermal deformation attitude that $\delta_l > \delta_r \geq 0$, and the check bar is close to the left displacement sensor and the right displacement sensor, the $d_{crs}(t)$ for any time t can be calculated from formula (7):

$$d_{crs}(t) = \frac{\delta_r(t)}{\delta_l(t) - \delta_r(t)} \times d_{spl} \tag{7}$$

; and calculating the thermal drift errors, $e_{1,x}(t)$ and $e_{2,x}(t)$, of the spindle in the X direction at any time t by formulas (8) and (9):

$$e_{2,x}(t) = \frac{\delta_l(t)d_{ss} - \delta_r(t)d_{ss} - \delta_r(t)d_{spl}}{\sin(\alpha_{xdir})^{-1}d_{spl}} \tag{8}$$

-continued $$e_{1,x}(t) = \frac{(\delta_l(t) - \delta_r(t))(d_{ss} + d_{snr}) - \delta_r(t)d_{spl}}{\sin(\alpha_{xdir})^{-1}d_{spl}} \tag{9}$$

analyzing the influence of the influence of the size of the machine tool's structure on the predicted result of the model, said analyzing comprising:

analyzing the influence of the measurement bias of $d_{spl}$ and $d_{ss}$ in the thermal drift error model on the predicted results of the model;

analyzing the reliability of the fluctuation value of the predicted residuals within a certain allowable deviation range using the asymptotic integration method; the expression of the function Z for the problem is described as:

$$Z = gx(X) = \delta - \delta_a(d_{spl}, d_{ss}) \tag{10}$$

wherein in the above formula, X is a random vector composed of $d_{spl}$ and $d_{ss}$, $\delta$ is the allowable deviation index, $\delta_a$ is the fluctuation value of the predicted residuals and is defined as:

$$\delta_a(d_{spl}, d_{ss}) = \frac{\sum_{i=1}^{N} |R(i) - R_n(i)|}{N} \tag{11}$$

wherein in the above formulas, R is the predicted residual of $d_{spl}$ and $d_{ss}$ as random variables, which is a function of $d_{spl}$ and $d_{ss}$, $R_n$ is the predicted residual of the model when $d_{spl}$ and $d_{ss}$ are true values, and N is the number of sampling points when the thermal error is measured;

wherein if $f_x(x)$ is a joint probability density function of X, then the probability that the fluctuation value of the predicted residuals do not fall within a certain allowable deviation range is calculated from formula (12):

$$p_f = \int_{gx(x) \leq 0} \exp[h(x)]dx \tag{12}$$

wherein in the above formulas, $h(x) = \ln f_x(x)$;

wherein if $x^* = (d_{spl}^*, d_{ss}^*)^T$ is a point on the surface of the limit state, at this point then h (x) is expanded into a Taylor series and taken to the quadratic term:

$$h(x) = h(x^*) + \frac{1}{2}v^T B v - \frac{1}{2}(x - x^* - Bv)B^{-1}(x - x^* - Bv) \tag{13}$$

wherein in the above formulas:

$$v = \nabla h(x^*) \tag{14}$$

$$B = [\nabla^2 h(x^*)]^{-1} \tag{15}$$

wherein the limit state surface $Z = gx(X) = 0$ is replaced by a hyperplane at point $x^*$ to realize the asymptotic integration of the probability that the fluctuation value of the predicted residual error exceeds the allowable range;

wherein the First-order Second-moment Method is used to calculate the reliability index that the fluctuation value of the predicted residuals belongs in a certain allowable deviation range according to formula (16):

$$\beta_L = \frac{\mu_{Z_L}}{\sigma_{Z_L}} = \frac{[\nabla gx(x^*)]^T B\upsilon}{\sqrt{[\nabla gx(x^*)]^T B \nabla gx(x^*)}} \quad (16)$$

wherein the First-order Second-moment Method is used to calculate the failure probability index that the fluctuation value of the predicted residual belongs in a certain allowable deviation range according to formula (17):

$$p_{fL} = (2)^{n/2} \sqrt{\det B} f_x(x^*) \exp\left(\frac{\upsilon^T B \upsilon}{2}\right) \Phi(-\beta_L) \quad (17)$$

wherein according to the Lagrange multiplier method for solving optimization problems, the multiplier $\lambda$ is introduced; From $$\frac{\partial L(x^*, \lambda)}{\partial x} = 0,$$

which is one of the stationary value conditions of the functional $L(x,\lambda)=h(x)+\lambda gx(x)$, the following result is then obtained:

$$\nabla gx(x^*) = -\frac{1}{\lambda}\nabla h(x^*) = -\frac{\upsilon}{\lambda} \quad (18)$$

wherein by substituting formula (18) into formula (16), the following result is obtained:

$$\beta_L = \sqrt{\upsilon^T B \upsilon} \quad (19)$$

wherein by substituting formula (19) into formula (17), the following result is obtained:

$$p_{fL} \approx (2\pi)^{(n-1)/2} f_x(x^*) \sqrt{\frac{\det B}{\upsilon^T B \upsilon}} \quad (20)$$

, and wherein the reliability that the fluctuating value of the predicted residuals, calculated by the asymptotic integration method, falls within a certain allowable deviation range is then obtained according to (21):

$$p_r = 1 - p_{fL} \quad (21)$$

; and determining of the spindle's thermal deformation attitude and model, said determining comprising:
judging the thermal deformation $\delta_l$, $\delta_r$ and $d_o$ of the two sides of the spindle box using the thermal deformation attitude of the spindle (1) which changes irregularly in the processing process; where $d_o$ is the distance from the intersection point of the spindle in the initial state and the deformed spindle to the right side of the spindle box (2);

calculating, under the various thermal deformation attitudes, the formulas of $d_o$ from formula (22):

$$d_\sigma(t) = d_{spl} \times \left| \frac{\zeta_{r1}(T_2(t) - T_2(0)) + \zeta_{r2}}{\zeta_{l1}(T_1(t) - T_1(0)) - \zeta_{r1}(T_2(t) - T_2(0)) + \zeta_{l2} - \zeta_{r2}} \right| \quad (22)$$

wherein the criteria for determining the thermal deformation attitudes of the spindle are set as follows:

attitude (1): $\delta_l > \delta_r \geq 0$, $d_o \leq d_{ss}$ attitude (2): $\delta_r < 0 < \delta_l$ attitude (3): $\delta_r \leq \delta_l < 0$ attitude (4): $\delta_l < \delta_r < 0$, $d_{ss} + d_{snr} < d_o$ attitude (5): $\delta_l > \delta_r \geq 0$, $d_{ss} < d_o < d_{ss} \pm d_{snr}$ attitude (6): $\delta_l < \delta_r < 0$, $d_{ss} < d_o \leq d_{ss} + d_{snr}$ attitude (7): $\delta_l > \delta_r \geq 0$, $d_{ss} + d_{snr} < d_o$ attitude (8): $\delta_r > \delta_l \geq 0$ attitude (9): $\delta_l < 0 < \delta_r$ attitude (10): $\delta_l < \delta_r < 0$, $d_o \leq d_{ss}$ considering the thermal tilt of the spindle, compensating the different errors for different lengths of the workpieces-; if $d_{wp}$ is the distance between the processed point on the workpiece and the end face of the chuck, and $d_s$ is the distance between the left displacement sensor and the end face of the chuck; under the various thermal deformation attitudes, whether $d_{wp} < d_s$, $d_s < d_{wp} < d_s + d_{snr}$ or $d_{wp} > d_s + d_{snr}$, the amount of thermal error compensation $e_{wp}$ of the machined spot on the workpiece is then calculated in accordance with formula (23):

$$e_{wp} = \frac{e_{2,x}(d_s + d_{snr} - d_{wp}) - e_{1,x}(d_s - d_{wp})}{d_{snr}} \quad (23)$$

; and inputting the thermal error's predicted value $e_{wp}$ is into the CNC system of the machine tool in real time to realize thermal error compensation for the spindle of the CNC lathe at any position or time.

* * * * *